(12) United States Patent
Suzumura

(10) Patent No.: US 8,335,264 B2
(45) Date of Patent: Dec. 18, 2012

(54) IMAGE INFORMATION TRANSMISSION APPARATUS

(75) Inventor: Tatsuhiro Suzumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 12/407,425

(22) Filed: Mar. 19, 2009

(65) Prior Publication Data

US 2009/0279613 A1 Nov. 12, 2009

(30) Foreign Application Priority Data

May 9, 2008 (JP) ................................. 2008-123757

(51) Int. Cl.
*H04N 11/02* (2006.01)
(52) U.S. Cl. .......... 375/240.25; 375/240.23; 375/240.26
(58) Field of Classification Search ............. 375/240.23, 375/240.26; 382/239; 341/61
See application file for complete search history.

(56) References Cited

U.S. PATENT DOCUMENTS

2005/0259879 A1* 11/2005 Hellman ........................ 382/239
2006/0061497 A1* 3/2006 Matsumura et al. ............. 341/61
2007/0285286 A1* 12/2007 Hussain et al. .................. 341/50
2008/0048893 A1* 2/2008 Xu ................................... 341/60
2008/0063082 A1* 3/2008 Watanabe et al. ........ 375/240.23

FOREIGN PATENT DOCUMENTS

| JP | 2006-180521 | 7/2006 |
| JP | 2007-295392 | 11/2007 |
| JP | 2008-11204 | 1/2008 |

OTHER PUBLICATIONS

NPL search results using INSPEC_1.pdf.*
NPL search results using INSPEC_2.pdf.*
Office Action issued Aug. 16, 2011, in Japanese Patent Application No. 2008-123757.

* cited by examiner

*Primary Examiner* — William C Vaughn, Jr.
*Assistant Examiner* — Luis M Perez Fuentes
(74) *Attorney, Agent, or Firm* — Oblon, Spivak, McClelland, Maier & Neustadt, L.L.P.

(57) ABSTRACT

A stream transmitting section outputs encoded stream data. A division instructing section generates dividing point information that designates a dividing point of the encoded stream data. A parallel stream transmitting section divides stream data that is output by the stream transmitting section and side information necessary for decoding from halfway along the stream that is extracted based on the stream data into a predetermined number of parts at dividing points designated by the dividing point information, performs parallelization thereof, and transmits data obtained as a result thereof to a stream decoding section on a receiving side.

19 Claims, 11 Drawing Sheets

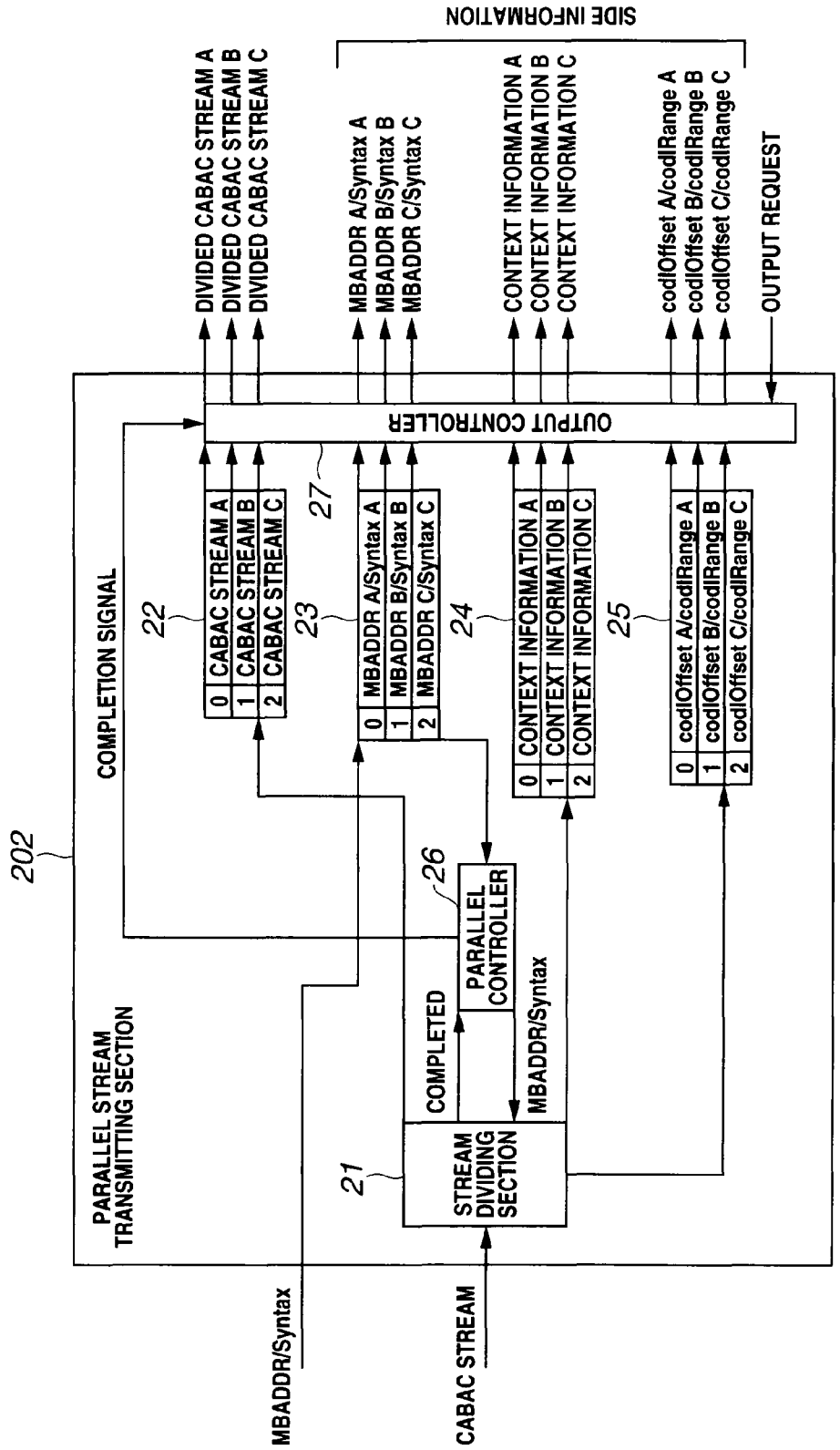

ENCODED STREAM DATA 1, 2, 3: SIDE INFORMATION EXTRACTION POINTS 1, 2: SIDE INFORMATION EXTRACTION POINTS

IMAGE INFORMATION TRANSMISSION APPARATUS

CROSS-REFERENCE TO RELATED APPLICATIONS

This application is based upon and claims the benefit of priority from the prior Japanese Patent Application No. 2008-123757 filed in Japan on May 9, 2008; the entire contents of which are incorporated herein by reference.

BACKGROUND OF THE INVENTION

1. Field of the Invention

The present invention relates to an image information transmission apparatus that parallelizes and transmits encoded stream data, and more particularly to an image information transmission apparatus that parallelizes and transmits CABAC stream data that has undergone adaptive binary arithmetic coding based on the H.264 standard.

2. Description of the Related Art

Conventionally, when transmitting CABAC stream data (hereunder, may be referred to simply as "CABAC stream") that has undergone context adaptive binary arithmetic coding (hereunder, referred to as CABAC: Context Adaptive Binary Arithmetic Coding) based on the H.264 standard, a stream transmitting apparatus sends the CABAC stream as a single stream to a CABAC decoding section. The CABAC decoding section on the receiving side is thus required to receive the single CABAC stream and perform decoding processing in real time.

Generally, when a CABAC stream is decoded, a decoding operation at a certain decoding point within a bit string of an encoded stream is dependent on context information that has been continuously changed during the preceding decoding operations. Accordingly, when a bit string of a stream that has been encoded using CABAC is decoded, it is necessary to perform decoding sequentially from the start of the bit string while updating context information. This is a factor that hinders parallelization of CABAC decoding processing and decreases the overall decoding processing performance of an image decoding apparatus.

Examples of a conventional information processing apparatus that performs this kind of parallel decoding processing of a CABAC stream include an apparatus that performs control such that a plurality of arithmetic decoding means individually refer to header information stored in a memory region to independently perform arithmetic decoding processing of a plurality of data slices (for example, see Japanese Patent Application Laid-Open Publication No. 2007-295392).

However, the apparatus disclosed in Japanese Patent Application Laid-Open Publication No. 2007-295392 is an apparatus that divides encoded stream data into slice units and performs parallel decoding processing thereon, and is not one that divides encoded stream data at arbitrary positions to perform parallel transmission and parallel decoding processing.

BRIEF SUMMARY OF THE INVENTION

According to one aspect of the present invention there is provided an image information transmission apparatus that includes a stream transmitting section configured to output encoded stream data; a division instructing section configured to generate dividing point information for designating a dividing point of the encoded stream data; and a parallel stream transmitting section configured to divide encoded stream data that is output by the stream transmitting section and side information necessary for decoding from halfway along a stream that is extracted based on the encoded stream data into a predetermined number of parts at dividing points that are designated by the dividing point information, perform parallelization thereof, and transmit data obtained as a result thereof to a stream decoding section on a receiving side.

BRIEF DESCRIPTION OF THE DRAWINGS

FIG. 2 is a block diagram that illustrates the configuration of a parallel stream transmitting section of the first embodiment;

DETAILED DESCRIPTION OF THE INVENTION

The related art of the present invention will first be described before describing embodiments of the present invention.

Figure 13:
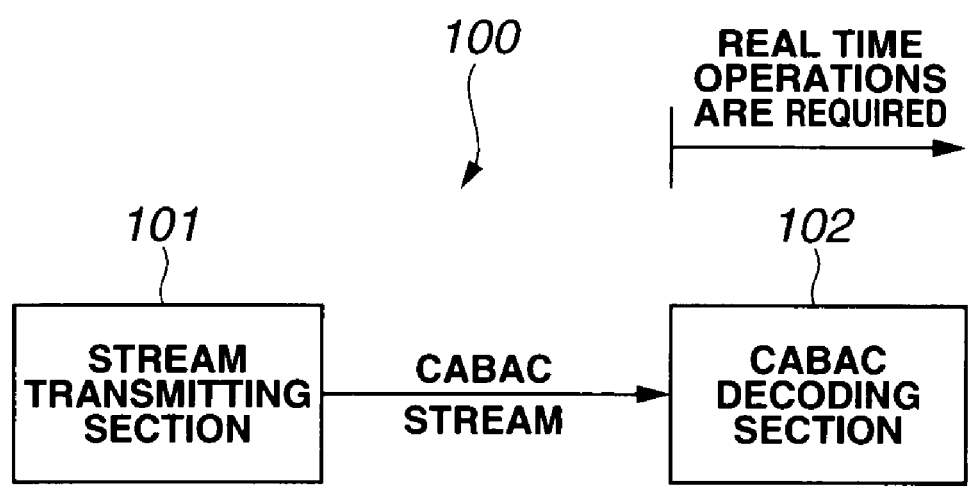
FIG. 13 is a basic block diagram of an image information transmission apparatus according to the related art of the present invention.

FIG. 13 is a basic block diagram of an image information transmission apparatus according to the related art of the present invention.

An image information transmission apparatus 100 shown in FIG. 13 includes a stream transmitting section 101 and a CABAC decoding section 102 that is the receiving side.

The stream transmitting section 101 transmits a CABAC stream as a single stream to the CABAC decoding section 102. In a case in which the stream transmitting section 101 transmits only encoded stream data in this manner, because the CABAC decoding section 102 is context adaptive, the current decoding is performed based on the past decoding status, and the encoded stream data cannot be divided at an appropriate position to perform parallel transmission. In this case, there is the possibility that the CABAC decoding section 102 will restrict the decoding processing throughput. This leads to a decline in the processing performance of the entire image processing apparatus and may result in a situation in which processing is not completed within a required time. Alternatively, it may be necessary to increase the operating frequency of the image processing apparatus in order to complete processing within a required time, and this leads to an increase in power consumption and an increase in development and production costs.

Hereunder, embodiments of the present invention are described referring to FIG. 1 to FIG. 12.

[First Embodiment]

Figure 1:
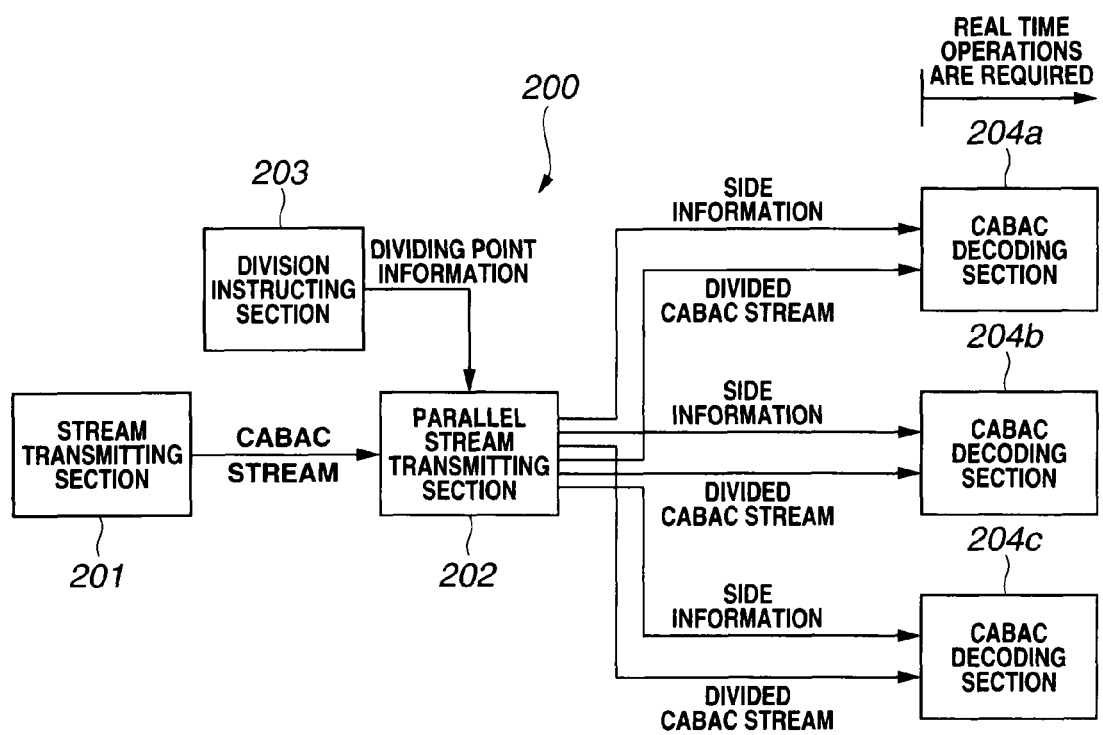
FIG. 1 is a block diagram that illustrates an image information transmission apparatus according to a first embodiment of the present invention.

FIG. 1 is a block diagram of an image information transmission apparatus according to the first embodiment of the present invention.

In an image information transmission apparatus 200 shown in FIG. 1, a parallel stream transmitting section 202 is provided between a stream transmitting section 201 that generates and outputs a CABAC stream and CABAC decoding sections 204a to 204c that are separated into a predetermined number of sections (for example, three). A CABAC stream from the stream transmitting section 201 is input into the parallel stream transmitting section 202, and dividing point information from a division instructing section 203 is also input into the parallel stream transmitting section 202. The division instructing section 203 generates dividing point information for designating dividing points of the CABAC stream data.

The parallel stream transmitting section 202 divides the CABAC stream from the stream transmitting section 201 at appropriate dividing points, and parallelizes and transmits the divided CABAC stream data. Simultaneously to transmitting the CABAC stream that has been divided into a predetermined number of parts (for example, three), the parallel stream transmitting section 202 sends side information for enabling the CABAC decoding sections 204a to 204c on the receiving side to perform decoding even from halfway along the stream. The side information is an information group that is necessary to enable the CABAC decoding sections 204a to 204c to perform decoding from a point that is halfway along the CABAC stream. The information group is described in detail later referring to FIG. 6. In this connection, a configuration may also be adopted in which, as the division instructing section 203, a section is provided within an unshown control section.

The CABAC decoding sections 204a to 204c are provided on the receiving side in the same number as the number of divisions (=parallelization number) into which the CABAC stream is divided by the parallel stream transmitting section 202. Each of the parts of the CABAC stream that is divided into three are input in parallel into the CABAC decoding sections 204a to 204c, respectively, and decoded in parallel thereby. The three parts of the CABAC stream data that have been decoded are then joined together by an unshown joining section to be restored to a single piece of decoded stream data and output.

In a case in which the encoded stream is a broadcast stream, the relation between the stream transmitting section 201 and the parallel stream transmitting section 202 on the transmitting side and the CABAC decoding sections 204a to 204c on the receiving side is that the stream transmitting section 201 and the parallel stream transmitting section 202 are a broadcast station and the CABAC decoding sections 204a to 204c are receiving apparatuses that are installed in the homes of viewers such as ordinary households. In this case, time is taken at the broadcast station to parallelize the CABAC stream into a predetermined number of streams, those streams are accumulated in a storage device inside the broadcast station in the parallelized state, and thereafter all the parallelized streams are transmitted at one time. At the home of a viewer, the streams that have been parallelized and transmitted are received simultaneously, and the streams are decoded in parallel in real time by CABAC decoding sections of the same number as the parallelization number. The decoded streams also undergo a joining process to restore the streams to a single stream and thereby obtain a decoded stream called a "binVal" stream. The binVal stream undergoes image decoding processing to be viewed by a viewer.

Alternatively, as another use, this embodiment can also be applied to a set-top box device. In such case, the stream transmitting section 201 and the parallel stream transmitting section 202 are configured as a recording device, the data that the recording device has taken time to parallelize is output in parallel from the recording device when the user wishes to view the data, the parallel output is decoded in parallel in real time with a decoding apparatus composed of the plurality of CABAC decoding sections 204a to 204c and, furthermore, the decoded streams are subjected to a joining process to restore the streams to a single stream for viewing. More specifically, in the case of a stream that includes a slice of data that is long with respect to time and which can not be decoded in real time, the stream is first of all stored on a HDD, and the parallel stream transmitting section 202 then takes time to perform parallelization processing on that stream. Thereafter, when viewing is possible after the parallelization processing, execution of parallel decoding processing is started upon a user operation or automatically to perform parallel decoding processing in real time and, further, a joining process is performed to restore the streams to a single stream for viewing.

FIG. 2 is a block diagram of the parallel stream transmitting section 202 shown in FIG. 1.

The parallel stream transmitting section 202 shown in FIG. 2 includes a stream dividing section 21, storage sections (hereunder, referred to as "memories") 22 to 25, a parallel controller 26, and an output controller 27 as an output section.

The stream dividing section 21 divides CABAC stream data that is input into a predetermined number of parts at dividing points that are designated by dividing point information from the aforementioned division instructing section 203, and sequentially outputs the predetermined number of stream data parts. Meanwhile, the stream dividing section 21 also extracts and sequentially outputs a predetermined number (in this case, three) of pieces of side information based on the CABAC stream data.

The memories 22 to 25 include a plurality of (in this case, four) storage devices (memories) that sequentially store stream data that is divided and sequentially output by the stream dividing section 21 as well as a predetermined number (in this case, three) of pieces of side information. Alternatively, instead of the plurality of (four) storage devices, the memories 22 to 25 may consist of a plurality of (four) storage areas in a single storage device. The memories 22 to 25 include a CABAC stream memory 22 for storing a plurality of CABAC streams that have been divided, a MBADDR/syntax information memory 23 for storing MBADDR/syntax information as dividing point information in correspondence with the number of divisions of the divided CABAC stream, a context information memory 24 for storing context information in correspondence with the number of divisions of the divided CABAC stream, and a codIOffset/codIRange memory 25 for storing codIOffset/codIRange in correspondence with the number of divisions of the divided CABAC stream. In this connection, codIOffset/codIRange is an intermediate variable specified in a specification that is necessary for arithmetic coding.

The parallel controller 26 performs control to cause the stream dividing section 21 to sequentially divide stream data and side information and sequentially store the resulting data in the memories 22, 24 and 25.

The output controller 27 as an output section parallelizes and outputs a plurality of (four) stream data and pieces of side information that are stored in the storage sections 22 to 25.

Figure 3B:
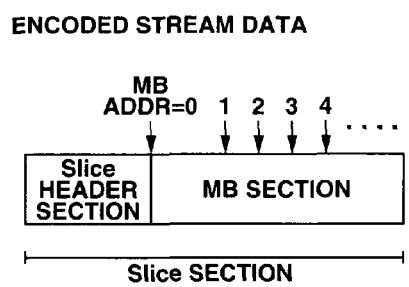
FIGS. 3A and 3B are views that explain slice data as encoded stream data.
Figure 3A:
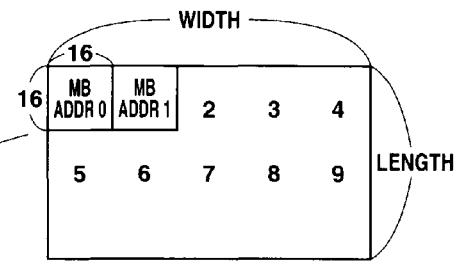

FIG. 3A is a view that illustrates macroblock addresses (MBADDR) of macroblocks (MB) that are arrayed two dimensionally lengthwise and widthwise. FIG. 3B illustrates encoded stream data in which the macroblock array shown in FIG. 3A is one-dimensionally arranged. A slice header section is added to the starting section of the macroblock (MB) section of the encoded stream data to constitute a slice section overall. Numbers are assigned to the MB section in the form of MBADDR=0, 1, 2, . . . .

Figure 4A:
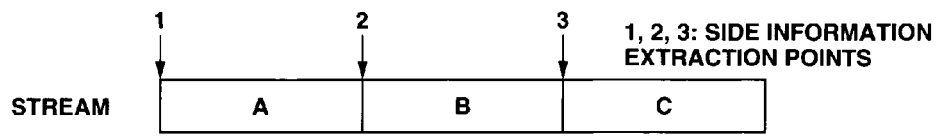
FIGS. 4A and 4B are views that explain a method of dividing a stream.
Figure 4B:
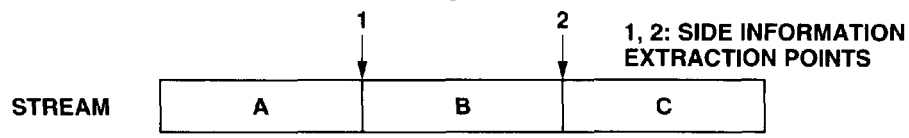

FIGS. 4A and 4B are views that explain a method of dividing a stream. FIG. 4A illustrates one example of the dividing method, and FIG. 4B illustrates another example of the dividing method. It is necessary to extract side information in order to divide a stream. In a case in which extraction points of the side information are, for example, points that divide a single stream into three streams A, B, and C, as shown in FIG. 4A, the result is as follows:
1. start
2. between stream A and stream B
3. between stream B and stream C.

Since the side information for the start of a stream is an initial value, a configuration can be considered in which it is unnecessary to extract side information for the start. In the case of such a configuration, as shown in FIG. 4B, the side information extraction points are:
1. between stream A and stream B
2. between stream B and stream C.
However, on the CABAC decoding side, it is necessary to perform an operation that generates an initial value of the side information when the start of the stream is decoded.

Figure 5:
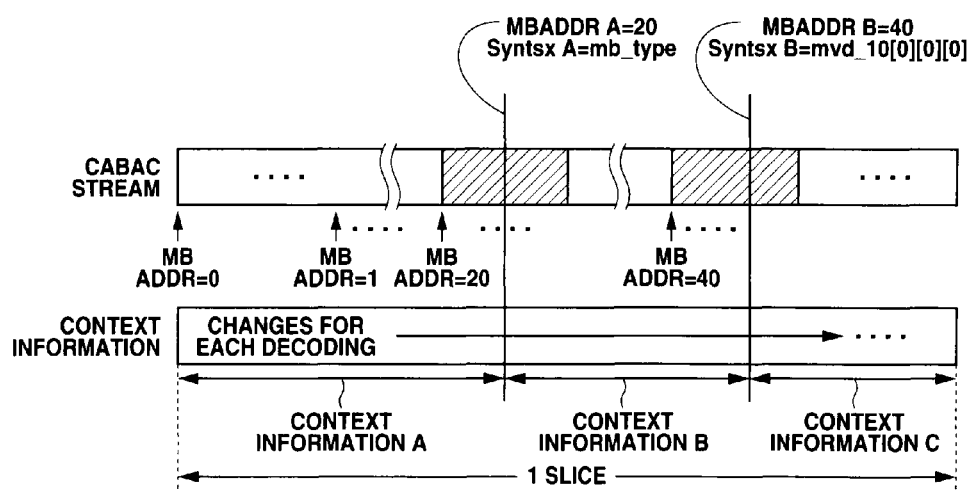
FIG. 5 is an explanatory view for explaining the operations of the image information transmission apparatus of the first embodiment of the present invention.

FIG. 5 illustrates macroblock stream sections of a CABAC stream. Numbers are also assigned to the stream data of the CABAC stream in the manner MBADDR=0, 1, 2, . . . , 20, . . . , 40, . . . . Each macroblock is made up of a plurality of syntax elements. The division of the CABAC stream shown in FIG. 5 illustrates a case in which a single slice unit is divided into a predetermined number of parts (for example, three).

According to this embodiment of the present invention, when this kind of CABAC stream data parallelized and transmitted, macroblock address and syntax information (MBADDR/Syntax) is used as dividing point information that indicates dividing points as shown in FIG. 5. For example, a case is illustrated in which MBADDRA=20/SyntaxA=mb_type is specified as a first dividing point and MBADDRB=40/SyntaxB=mvd_10[0][0][0] is specified as a second dividing point. By specifying a syntax element Syntax in addition to a macroblock address MBADDR in this manner, it is possible to specify dividing points at positions located halfway along the respective macroblocks (diagonally shaded areas) of MBADDRA=20, 40. In this connection, the two sections indicated with diagonal lines in the CABAC stream shown in FIG. 5 respectively represent the range of the macroblocks indicated by the macroblock addresses MBADDR=20 and MBADDR=40. Thus, stream data is divided into three parts within a single slice unit.

With respect to context information, the information changes each time decoding is performed. Context information A is specified in correspondence to the region from the start to MBADDR=20/Syntax=mb_type that is the first dividing point. Context information B is specified in correspondence to the region from immediately after the first dividing point to MBADDR=40/Syntax=mvd_10[0][0][0] that is the second dividing point. Context information C is specified in correspondence to the region from immediately after the second dividing point to the end of the slice.

Figure 6:
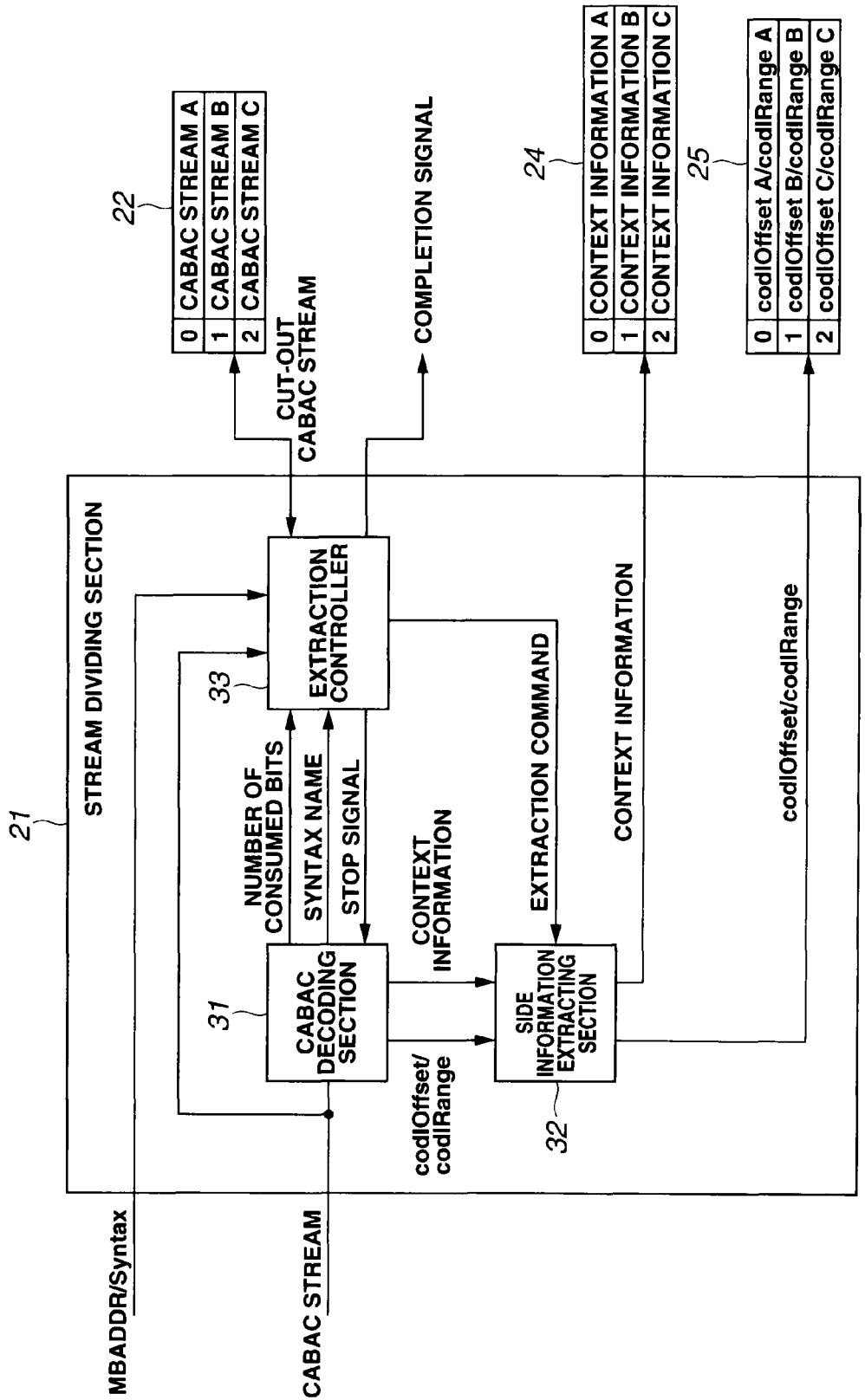
FIG. 6 is a block diagram that illustrates the configuration of a stream dividing section of the first embodiment.

FIG. 6 is a block diagram of the stream dividing section 21 shown in FIG. 2.

The stream dividing section 21 shown in FIG. 6 includes a CABAC decoding section 31, a side information extracting section 32, and an extraction controller 33.

The CABAC decoding section 31 performs operations to decode CABAC code and thereby decode input stream data based on context information that is internal information. The CABAC decoding section 31 can be stopped with a stop signal from the extraction controller 33, and outputs the number of consumed bits or a syntax name. The CABAC decoding section 31 holds context information and codIOffset/codIRange as internal information.

The side information extracting section 32 extracts context information and codIOffset/codIRange that the CABAC decoding section 31 is holding as internal information.

The extraction controller 33 divides and outputs an input CABAC stream based on dividing point information (MBADDR/Syntax) from the division instructing section 203 and information regarding number of consumed bits and syntax name from the CABAC decoding section 31.

Next, the operations of the present embodiment are described.

At the parallel stream transmitting section 202 shown in FIG. 2, first, information regarding points at which division is to be performed is input as MBADDR/Syntax information from outside to the MBADDR/Syntax information memory 23 and stored therein. MBADDR/Syntax information for the number of points at which division is to be performed this time is input to the memory 23. According to the present embodiment, three division points are input, respectively, to three storage areas 0 to 2 of the memory 23. The configuration is such that the MBADDR/Syntax information stored in the memory 23 is supplied to the stream dividing section 21 via the parallel controller 26.

When a CABAC stream is input to the parallel stream transmitting section 202, the stream dividing section 21 divides the stream based on dividing point information (MBADDRISyntax) that is input from the parallel controller 26 and stores the stream in divided units in the CABAC stream memory 22. At the same time, the stream dividing section 21 extracts context information and codIOffset/codIRange, stores the context information and codIOffset/codIRange in the respective memories 24 and 25, and outputs a completion signal. According to the present embodiment, the stream is divided into three parts. When parallelization processing of the stream ends, the parallel controller 26 outputs a completion signal. After receiving the completion signal, the output controller 27 sends the parallel streams in response to an output request from outside.

The above described operations will now be specifically explained referring to FIG. 5. The parallel controller 26 specifies MBADDR=20/Syntax=mb_type that is obtained from the MBADDR/Syntax information memory 23 as a first dividing point with respect to the stream dividing section 21, and stores the input stream as a first divided CABAC stream A in a storage area 0 of the CABAC stream memory 22 until the input CABAC stream reaches MBADDR=20/Syntax=mb_type. At the same time, the parallel controller 26 extracts first context information and codIOffset/codIRange and stores the first context information and codIOffset/codIRange in memories 24 and 25, respectively. At this time, when the input CABAC stream has been read in as far as MBADDR=20/syntax=mb_type and output to the CABAC stream memory 22, the stream dividing section 21 notifies the parallel controller 26 to that effect with a first completion signal. Thereupon, the parallel controller 26 obtains the next MBADDR=40/Syntax=mvd_l0[0][0][0] from the MBADDR/Syntax information memory 23, specifies the MBADDR=40/Syntax=mvd_l0[0][0][0] as second dividing point information to the stream dividing section 21, and stores the input stream as a second divided CABAC stream B in a storage area 1 of the CABAC stream memory 22 until the input CABAC stream reaches MBADDR=40/Syntax=mvd_l0[0][0][0]. At the same time, the parallel controller 26 extracts second context information and codIOffset/codIRange and stores the second context information and codIOffset/codIRange in memories 24 and 25, respectively. At this time, when the input CABAC stream has been read in as far as MBADDR=40/Syntax=mvd_l0[0][0][0] and output to the CABAC stream memory 22, the stream dividing section 21 notifies the parallel controller 26 to that effect with a second completion signal. Similarly, the parallel controller 26 stores a third divided CABAC stream C in a storage area 2 of the CABAC stream memory 22, and simultaneously extracts a third context information and codIOffset/codIRange and stores the extracted context information and codIOffset/codIRange in memories 24 and 25, respectively. Thus, the parallelization processing proceeds.

The operations of the stream dividing section 21 will now be described referring to FIG. 6.

As shown in the stream dividing section 21 of FIG. 6, upon input of a CABAC stream, the CABAC decoding section 31 performs a decoding operation based on context information that is internal information. This operation is the same as a normal CABAC decoding operation. Each time the CABAC decoding section 31 finishes decoding of syntax, the CABAC decoding section 31 outputs the decoded syntax name and the number of consumed bits in the stream to the extraction controller 33.

Sequentially, the extraction controller 33 performs processing to determine the decoded syntax name, issues a temporary stop command to the CABAC decoding section 31 at a point that matches the MBADDR/syntax information that is input as dividing point information, and issues an extract command to the side information extracting section 32. Further, at this time the extraction controller 33 divides the CABAC stream based on the consumed bit number information, and sends the divided CABAC streams to the CABAC stream memory 22.

Upon receiving an extract command from the extraction controller 33, the side information extracting section 32 extracts context information and codIOffset/codIRange from the CABAC decoding section 31, and delivers the extracted information to the respective memories 24 and 25. Upon the side information extracting section 32 completing delivery of this information, the extraction controller 33 outputs a completion signal. The completion signal is sent to the parallel controller 26. A CABAC stream can be divided and parallelized by this series of operations.

Figure 7:
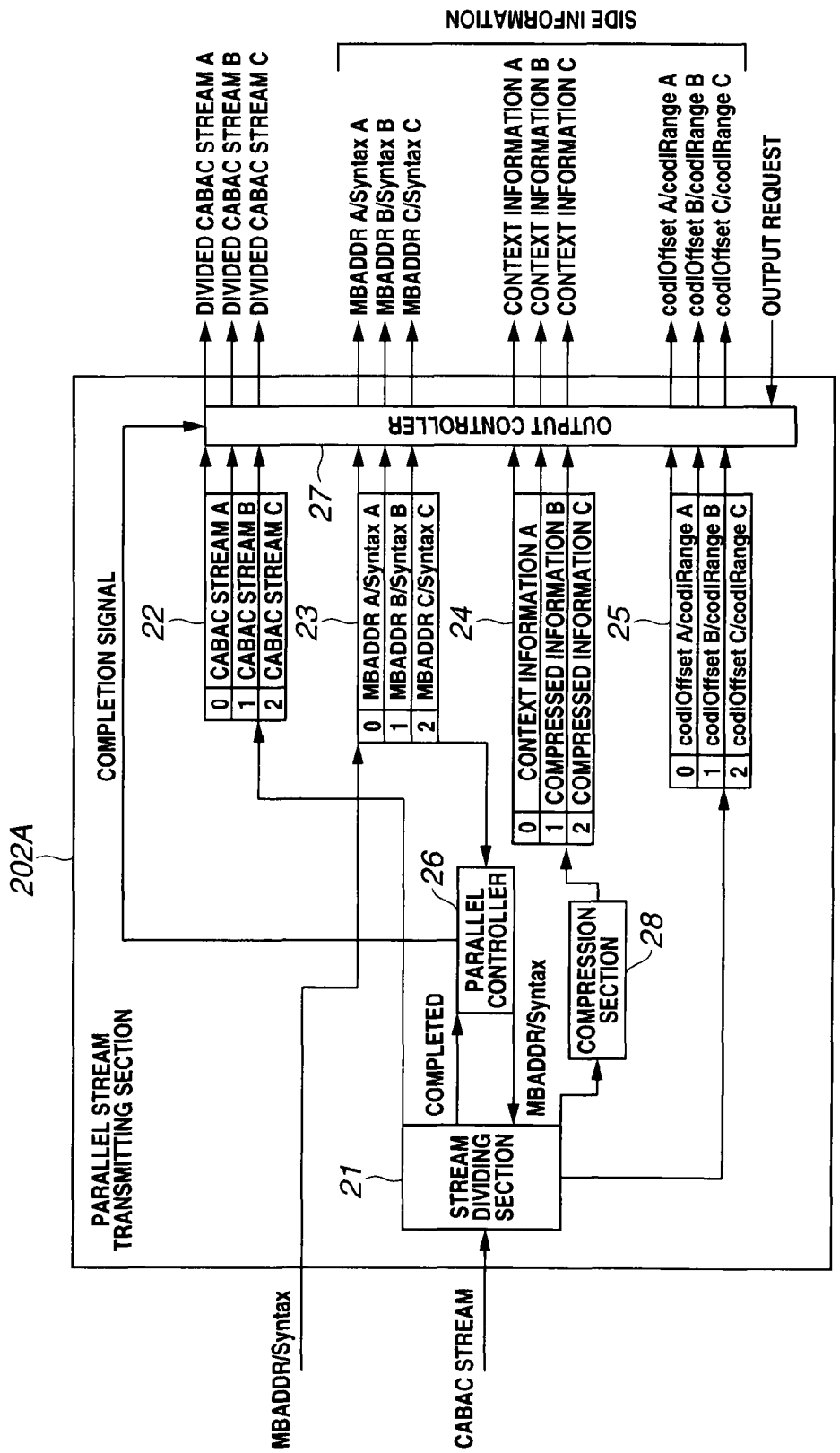
FIG. 7 is a block diagram that illustrates a modification example of the parallel stream transmitting section of the first embodiment.
Figure 8:
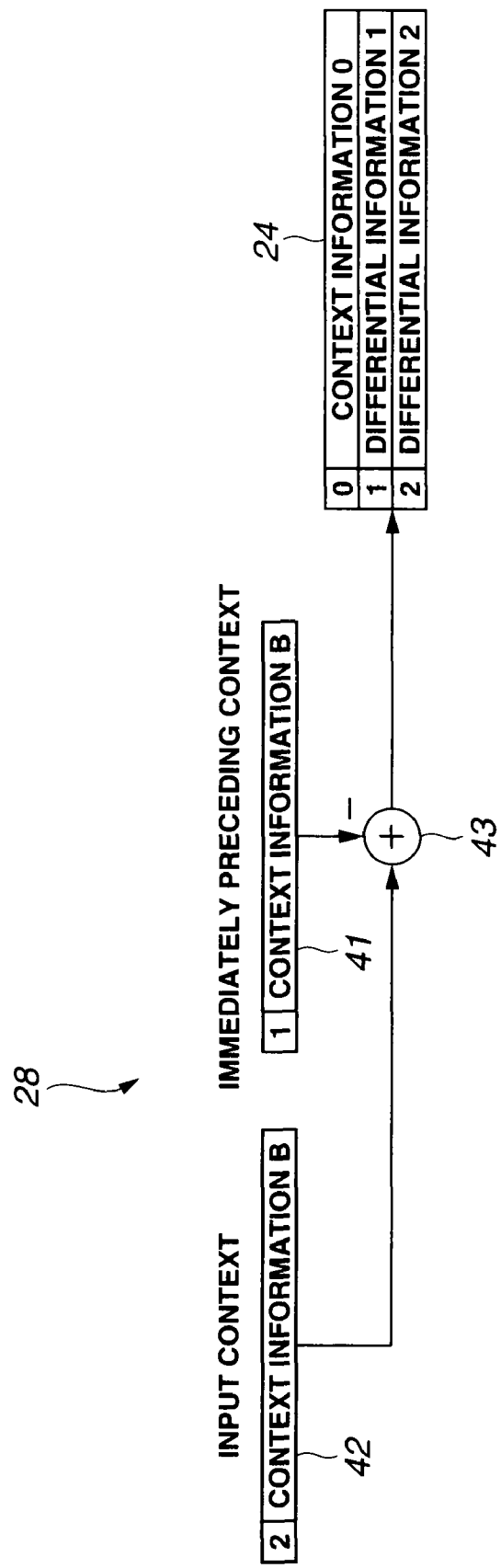
FIG. 8 is a block diagram that illustrates a configuration example of a compression section shown in FIG. 7.

FIG. 7 is a view that shows a modification example of the parallel stream transmitting section in FIG. 1. FIG. 8 shows a configuration example of a compression section shown in FIG. 7.

A parallel stream transmitting section 202A shown in FIG. 7 has a configuration in which, with respect to the parallel stream transmitting section 202 shown in FIG. 2, a compression section 28 is added for compressing context information. Context information that is compressed with the compression section 28 is stored as compressed information in the context information memory 24. A storage state of the memory 24 shown in FIG. 5 is a state that is based on operations in a case in which the compression section 28 is provided as in the configuration shown in FIG. 8. In this connection, it is also possible for an added compression section to be used to compress information other than context information. However, in this case the reason for providing the compression section 28 to compress only context information is that the amount of context information is large in comparison to amounts of other information.

In this connection, the compression section 28 is not limited to use for compressing specific side information (for example, context information) for which an information amount among side information output from the stream dividing section 21 is large in comparison to amounts of other side information, and naturally the compression section 28 may be used for compressing other side information.

The configuration shown in FIG. 7 is the same as that shown in FIG. 2 with the exception that context information output by the stream dividing section 21 is compressed and stored in the memory 24.

The compression section 28 can, for example, be configured as shown in FIG. 8. The compression section 28 includes a memory 41 that stores context information from the previous (immediately preceding) time, a memory 42 that holds context information that is input this time, and a subtracter 43 that obtains differential information between the context information that is input this time and the context information from the previous (immediately preceding) time.

The compression section 28 acquires only differential information between the context information of the memory 41 and the context information of the memory 42 with the subtracter 43, and stores the differential information in the context information memory 24. If the current context information is first context information A, since there is no context information (information is cleared) from the previous (immediately preceding) time, the context information A is stored as differential information in storage area 0 of the memory 24. If the current context information is second context information B and the context information from the previous (immediately preceding) time is the first context information A, differential information 1 is obtained as compressed information and stored in storage area 1 of the memory 24. If the current context information is third context information C and the context information from the previous (immediately preceding) time is the second context information B, differential information 2 is obtained as compressed information and stored in storage area 2 of the memory 24. In this connection, a configuration may also be adopted in which the obtained differential information I and 2 is further compressed.

The compression section 28 is provided to reduce the information amount of compressed data and reduce the storage capacity of the context information memory 24, or to reduce the transmission capacity that is transmitted to the outside from the parallel stream transmitting section 202A. It is therefore necessary to provide an expansion section to expand compressed data at a stage prior to performing decoding processing with the downstream CABAC decoding sections 204a to 204c for which real time operations are necessary. The expansion section may be provided immediately before or immediately after the output controller 27, or may be provided at the front end of or immediately before the CABAC decoding sections 204a to 204c that are the receiving side.

According to the first embodiment, it is possible to divide input CABAC stream data into a predetermined number of parts within a single slice unit based on dividing point information and to parallelize arithmetic decoding processing. It is thereby possible to decrease power consumption, reduce development and production costs, and enhance market appeal without increasing the operating frequency. Since CABAC stream data can also be finely divided within a single slice unit, it is possible to make a large number of divisions and improve image decoding processing performance to answer demands accompanying the generation of increasingly higher definition images.

In this connection, the image information transmission apparatus of the first embodiment shown in FIG. 2, FIG. 6, and FIG. 7 above is an apparatus that divides input CABAC stream data into a predetermined number of parts within a single slice unit based on dividing point information (MBADDR/Syntax).

In contrast, an image information transmission apparatus of the second embodiment that is described below is an apparatus that divides input CABAC stream data into a predetermined number of parts that straddle a plurality of slices based on dividing point information (MBADDR/Syntax/Slice).

[Second Embodiment]

The overall configuration of an image information transmission apparatus according to a second embodiment of the present invention is the same as in FIG. 1. Further, the respective configurations of parallel stream transmitting sections 202 and 202A and stream dividing section 21 in the image information transmission apparatus of the second embodiment are also the same as the respective configurations shown in FIG. 2, FIG. 7, and FIG. 6 of the first embodiment.

Figure 9:
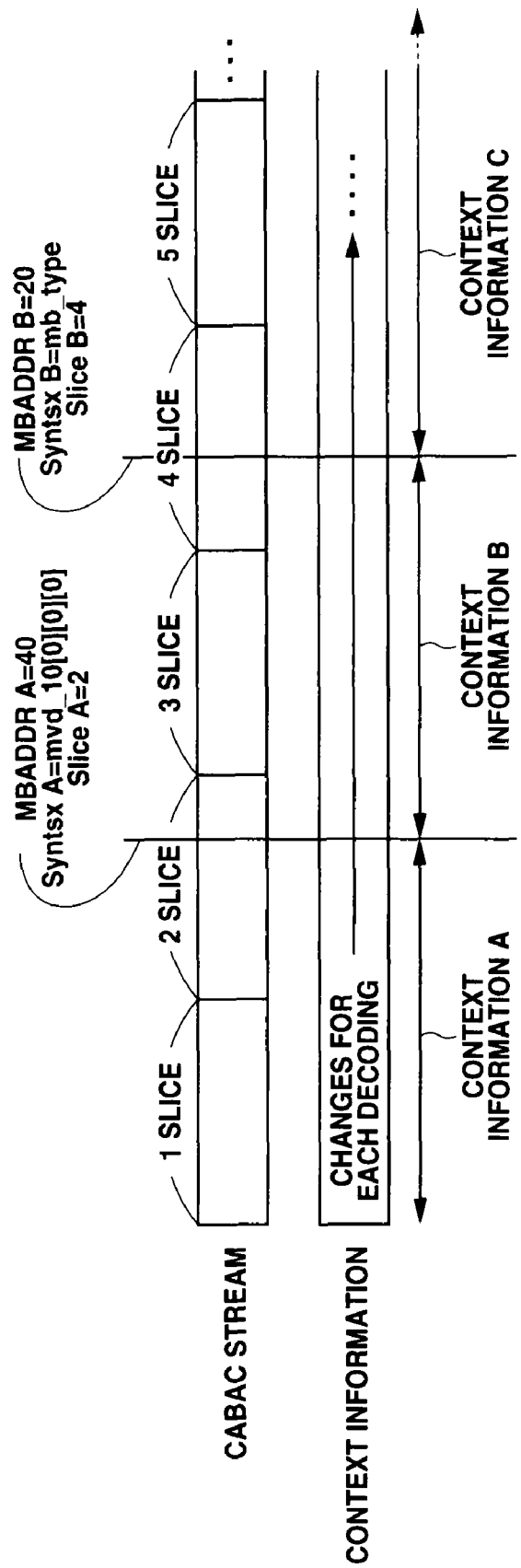
FIG. 9 is an explanatory view for explaining the operations of an image information transmission apparatus according to a second embodiment of the present invention.

The second embodiment differs from the first embodiment in the respect that, as shown in FIG. 9, an input CABAC stream data is divided into a predetermined number (for example, three) of parts that straddle a plurality of slices. That is, it is possible to specify a dividing point at a halfway position in a macroblock that straddles a plurality of slices. As the dividing point information, a slice number (Slice) is necessary in addition to macroblock address/syntax information (MBADDR/Syntax). Thus, a dividing point is specified using three parameters consisting of macroblock address, syntax, and slice information (MBADDR/Syntax/Slice).

Figure 10:
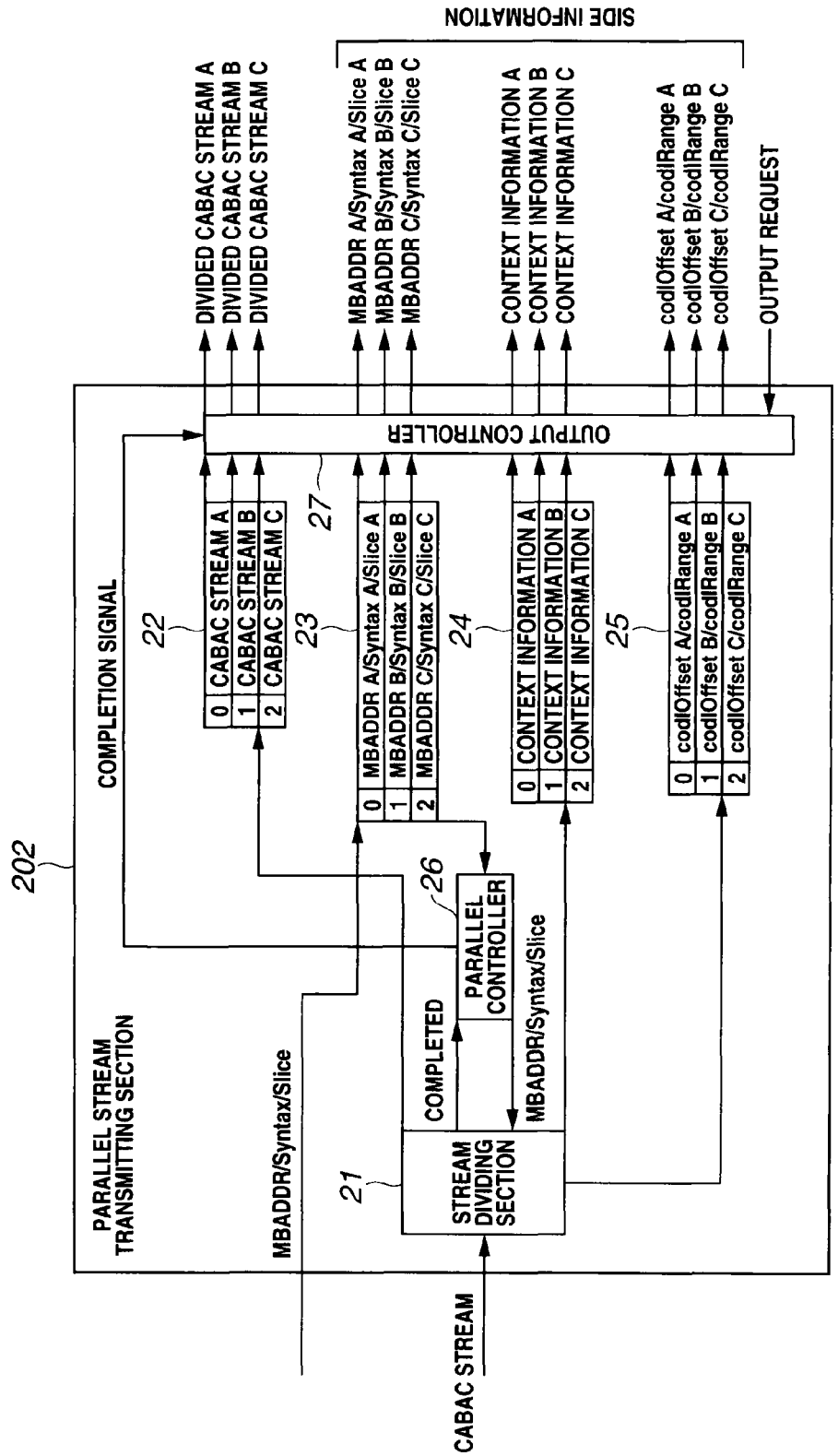
FIG. 10 is a block diagram that illustrates the configuration of a parallel stream transmitting section of the second embodiment.

FIG. 10 is a view that illustrates the configuration of the parallel stream transmitting section 202. The differences with the parallel stream transmitting section 202 shown in FIG. 2 are that input dividing point information includes three parameters consisting of MBADDR/Syntax/Slice, and that MBADDRA/SyntaxA/SliceA, MBADDRB/SyntaxB/SliceB, and MBADDRC/SyntaxC/SliceC as three pieces of dividing point information from the division instructing section 203 are previously stored in three storage areas 0 to 2 of the memory 23, respectively, prior to performing parallelization processing.

Figure 11:
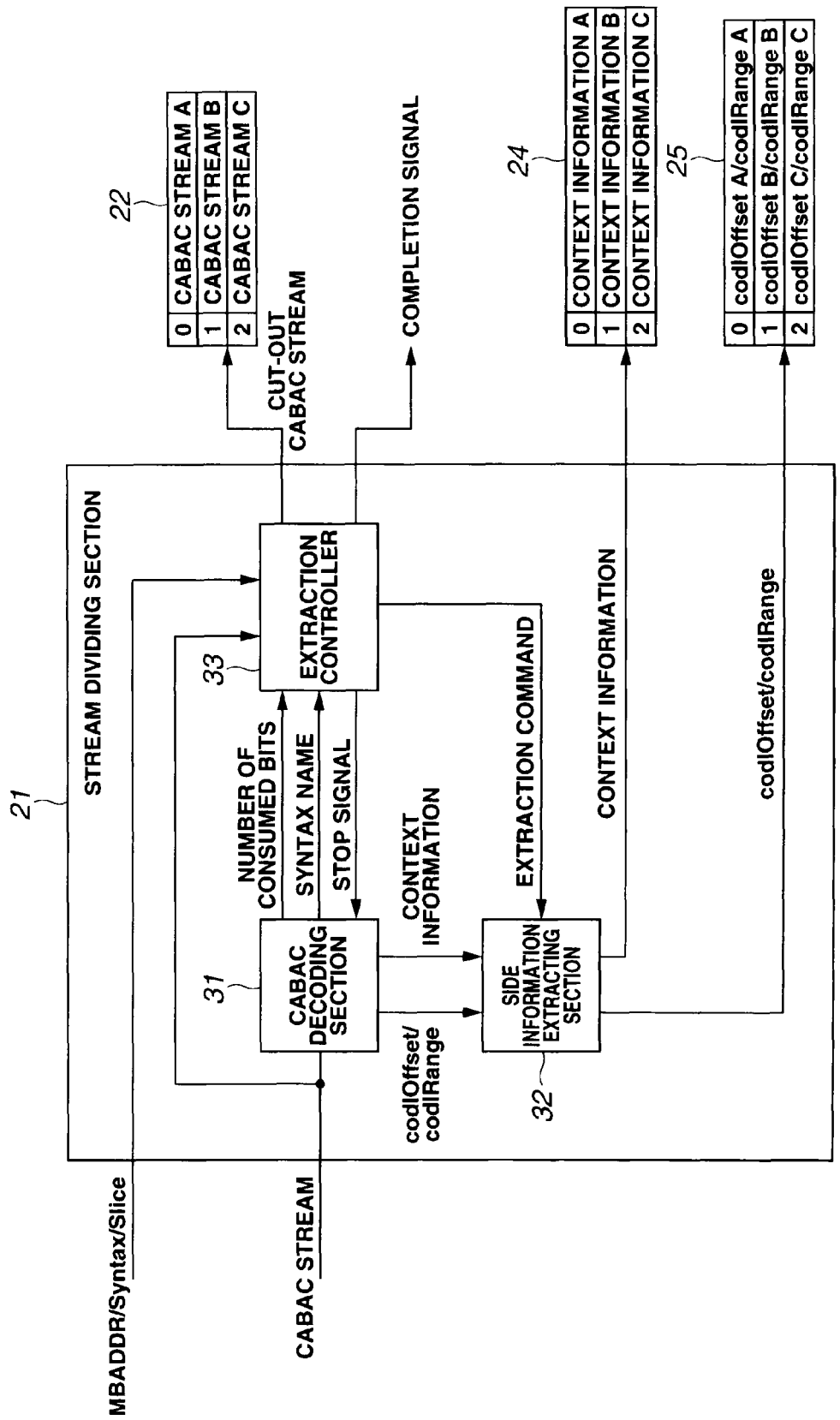
FIG. 11 is a block diagram that illustrates the configuration of a stream dividing section of the second embodiment.

FIG. 11 illustrates the configuration of the stream dividing section 21. The difference from the configuration shown in FIG. 6 is that the dividing point information input into the extraction controller 33 consists of three parameters, i.e. MBADDR/Syntax/Slice. The remaining configuration is the same as in FIG. 6.

Figure 12:
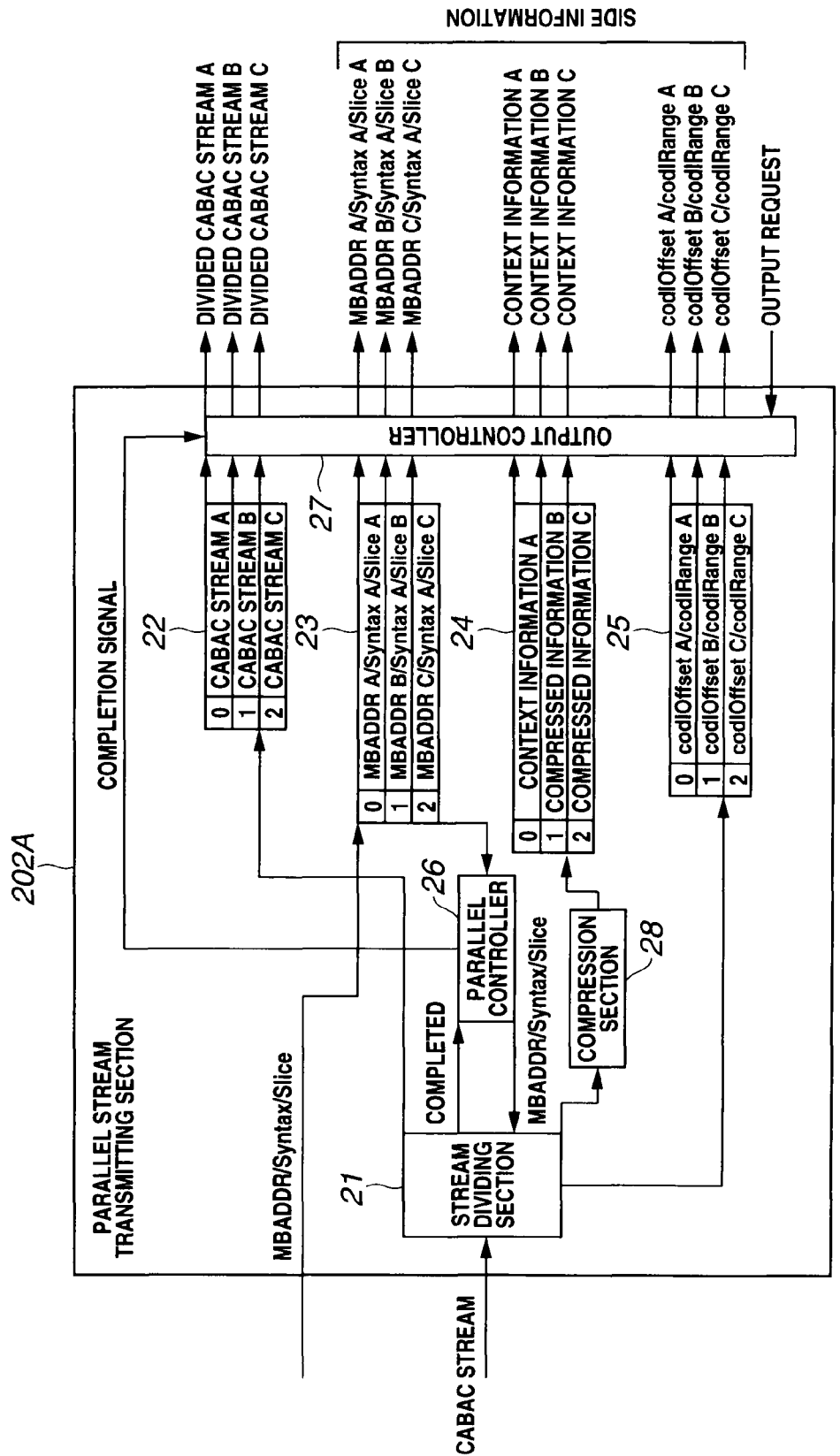
FIG. 12 is a block diagram that illustrates a modification example of the parallel stream transmitting section of the second embodiment.

FIG. 12 is a view illustrating the configuration of the parallel stream transmitting section 202A that includes the compression section 28 that compresses context information. The difference from the configuration shown in FIG. 7 is also that dividing point information previously set in the memory 23 includes three parameters, i.e. MBADDR/Syntax/Slice. MBADDRA/SyntaxA/SliceA, MBADDRB/SyntaxB/SliceB, and MBADDRC/SyntaxC/SliceC that are three pieces of dividing point information from the division instructing section 203 are previously stored in the three storage areas 0 to 2 of the memory 23, respectively, prior to performing parallelization processing. The remaining configuration is the same as in FIG. 7.

According to the second embodiment, it is possible to divide input CABAC stream data into a predetermined number of parts that straddle a plurality of slices based on dividing point information and to parallelize arithmetic decoding processing. It is thereby possible to decrease power consumption, reduce development and production costs, and enhance market appeal without increasing the operating frequency. Since it is also possible to make large divisions that straddle a plurality of slices, a small number of divisions can be made to thereby reduce the number of image decoding apparatuses.

According to the present embodiments described above, under an environment in which improved processing performance of image decoding apparatuses is being required more and more accompanying the generation of increasingly higher definition images, by parallelizing arithmetic decoding processing that is a rate-determining factor in the processing performance of image decoding apparatuses, it is possible to overcome the rate-determining factor without leading to a significant increase in operating frequency. Further, this operating frequency reduction effect contributes to reduced power consumption, reduced development and productions costs, and enhanced market appeal.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image information transmission apparatus, comprising:
a stream transmitting section configured to output encoded stream data;
a division instructing section configured to generate dividing point information for designating a dividing point of the encoded stream data; and
a parallel stream transmitting section configured to divide encoded stream data that is output by the stream transmitting section and side information necessary for decoding from halfway along a stream that is extracted based on the encoded stream data into a predetermined number of parts at dividing points that are designated by the dividing point information, perform parallelization thereof, and transmit data obtained as a result thereof to a stream decoding section on a receiving side,
wherein the parallel stream transmitting section further includes:
a stream dividing section configured to divide input encoded stream data into a predetermined number of parts at dividing points that are designated by the dividing point information from the division instructing section and sequentially output data obtained as a result, and at the same time to sequentially output side information that is divided into a predetermined number of parts that is the same as the number of divisions and is extracted based on the encoded stream data;
a storage section configured to sequentially store encoded stream data and side information that are sequentially divided at the stream dividing section;

a parallel controller configured to perform control for causing encoded stream data and side information to be sequentially divided at the stream dividing section and sequentially stored at the storage section; and an output section configured to parallelize and output a predetermined number of pieces of encoded stream data and side information that are stored in the storage section.

2. The image information transmission apparatus according to claim 1, wherein the stream dividing section comprises:
a CABAC decoding section configured to decode input encoded stream data based on context information that is internal information;
a side information extracting section configured to extract context information and codIOffset/codIRange from the CABAC decoding section; and
an extraction controller configured to control an operation to divide the encoded stream data and an extraction operation of the side information extracting section based on the dividing point information and syntax information and consumed bit number information from the CABAC decoding section.

3. The image information transmission apparatus according to claim 1, wherein the parallel stream transmitting section is configured to divide input encoded stream data into a predetermined number of parts within a single slice unit based on the dividing point information.

4. The image information transmission apparatus according to claim 1, wherein the parallel stream transmitting section is configured to divide input encoded stream data into a predetermined number of parts within a single slice unit based on the dividing point information.

5. The image information transmission apparatus according to claim 2, wherein the parallel stream transmitting section is configured to divide input encoded stream data into a predetermined number of parts within a single slice unit based on the dividing point information.

6. The image information transmission apparatus according to claim 1, wherein the parallel stream transmitting section is configured to divide input encoded stream data into a predetermined number of parts that straddle a plurality of slices based on the dividing point information.

7. The image information transmission apparatus according to claim 1, wherein the parallel stream transmitting section is configured to divide input encoded stream data into a predetermined number of parts that straddle a plurality of slices based on the dividing point information.

8. The image information transmission apparatus according to claim 2, wherein the parallel stream transmitting section is configured to divide input encoded stream data into a predetermined number of parts that straddle a plurality of slices based on the dividing point information.

9. The image information transmission apparatus according to claim 3, wherein, by using syntax information that indicates a syntax element in addition to a macroblock address of a macroblock comprising a slice as the dividing point information, it is possible to designate a dividing point at a position that is halfway along a macroblock.

10. The image information transmission apparatus according to claim 4, wherein, by using syntax information that indicates a syntax element in addition to a macroblock address of a macroblock comprising a slice as the dividing point information, it is possible to designate a dividing point at a position that is halfway along a macroblock.

11. The image information transmission apparatus according to claim 5, wherein, by using syntax information that indicates a syntax element in addition to a macroblock address of a macroblock comprising a slice as the dividing point information, it is possible to designate a dividing point at a position that is halfway along a macroblock.

12. The image information transmission apparatus according to claim 6, wherein, by using a slice number in addition to syntax information that indicates a syntax element and a macroblock address of a macroblock comprising a slice as the dividing point information, it is possible to designate a dividing point at a position that is halfway along a macroblock that straddles a plurality of slices.

13. The image information transmission apparatus according to claim 7, wherein, by using a slice number in addition to syntax information that indicates a syntax element and a macroblock address of a macroblock comprising a slice as the dividing point information, it is possible to designate a dividing point at a position that is halfway along a macroblock that straddles a plurality of slices.

14. The image information transmission apparatus according to claim 8, wherein, by using a slice number in addition to syntax information that indicates a syntax element and a macroblock address of a macroblock comprising a slice as the dividing point information, it is possible to designate a dividing point at a position that is halfway along a macroblock that straddles a plurality of slices.

15. The image information transmission apparatus according to claim 1, wherein the parallel stream transmitting section comprises a compression section configured to compress the side information that is output from the stream dividing section.

16. The image information transmission apparatus according to claim 2, wherein the parallel stream transmitting section comprises a compression section configured to compress the side information that is output from the stream dividing section.

17. The image information transmission apparatus according to claim 3, wherein the parallel stream transmitting section comprises a compression section configured to compress the side information that is output from the stream dividing section.

18. The image information transmission apparatus according to claim 6, wherein the parallel stream transmitting section comprises a compression section configured to compress the side information that is output from the stream dividing section.

19. The image information transmission apparatus according to claim 15, wherein the compression section comprises:
a memory configured to store side information of a preceding time;
a memory configured to hold side information that is input at a current time; and
a subtracter configured to obtain differential information between the side information that is input at a current time and the side information of a preceding time.

* * * * *